United States Patent [19]

Jackson

[11] 4,347,973

[45] Sep. 7, 1982

[54] INTERNAL COMBUSTION ENGINE COOLANT SYSTEM, THERMOSTAT THEREFOR AND METHODS OF MAKING THE SAME

[75] Inventor: Byron L. Jackson, Knoxville, Tenn.

[73] Assignee: Robertshaw Controls Company, Richmond, Va.

[21] Appl. No.: 226,800

[22] Filed: Jan. 21, 1981

[51] Int. Cl.³ .............................................. F01P 7/02
[52] U.S. Cl. ................................... 236/34.5; 137/199
[58] Field of Search ................ 236/34, 34.5; 137/197, 137/199; 417/435

[56] References Cited

U.S. PATENT DOCUMENTS

| | | | |
|---|---|---|---|
| 1,014,229 | 7/1912 | Kelsey | 137/197 |
| 2,829,835 | 4/1958 | Branson | 236/34.5 |
| 2,880,744 | 4/1959 | Daley, Jr. | 137/197 |
| 3,719,197 | 3/1973 | Pannier, Jr. et al. | 137/199 X |
| 3,973,729 | 8/1976 | Sliger | 236/34.5 |
| 4,091,991 | 5/1978 | Sliger | 236/34.5 |

FOREIGN PATENT DOCUMENTS

| | | | |
|---|---|---|---|
| 874780 | 7/1971 | Canada | 137/197 |
| 870363 | 6/1961 | United Kingdom | 236/34 |
| 893671 | 4/1962 | United Kingdom | 236/34 |
| 977658 | 12/1964 | United Kingdom | 236/34 |

Primary Examiner—William E. Tapolcai, Jr.
Attorney, Agent, or Firm—Candor, Candor & Tassone

[57] ABSTRACT

An internal combustion engine coolant system having a radiator for receiving coolant into an inlet thereof from an outlet of the engine through a thermostat that is disposed intermediate the outlet of the engine and the inlet of the radiator and having a coolant pump for circulating the coolant through the engine from an inlet of the engine to the outlet thereof, the pump having a first inlet interconnected to the outlet of the engine upstream of the thermostat and a second inlet interconnected to the outlet of the radiator while having its outlet interconnected to the inlet of the engine. The thermostat has a vent valve unit carried by the main valve member thereof for venting air from the outlet of the engine to the inlet of the radiator when the main valve member of the thermostat is in a closed condition against the main valve seat thereof and the system is being filled with coolant that is being introduced into the radiator and for preventing coolant flow through the vent valve unit when the pump is circulating the coolant and the main valve member of the thermostat is in a closed condition against the main valve seat, the vent valve unit comprising a vent opening through the main valve member and a flexible valve member for opening and closing the vent opening. The flexible vent valve member is normally held in spaced relation from the vent opening and is adapted to be flexed against the vent opening to close the vent opening by the coolant being circulated by the pump.

40 Claims, 7 Drawing Figures

INTERNAL COMBUSTION ENGINE COOLANT SYSTEM, THERMOSTAT THEREFOR AND METHODS OF MAKING THE SAME

BACKGROUND OF THE INVENTION

1. Field of the Invention

This invention relates to an improved internal combustion engine coolant system and to an improved thermostat therefor as well as to methods of making the same.

2. Prior Art Statement

It is known to provide an internal combustion engine coolant system having a radiator for receiving coolant into an inlet thereof from an outlet of the engine through a thermostat disposed intermediate the outlet of the engine and the inlet of the radiator and having a coolant pump for circulating the coolant through the engine from an inlet of the engine to the outlet thereof, the pump having a first inlet interconnected to the outlet of the engine upstream of the thermostat and a second inlet interconnected to the outlet of the radiator while having its outlet interconnected to the inlet of the engine. The thermostat has a vent valve means carried by the main valve member thereof or other part of the thermostat for venting air from the outlet of the engine to the inlet of the radiator when the main valve member of the thermostat is in a closed condition against the main valve seat thereof and the system is being filled with coolant that is being introduced into the radiator and for preventing coolant flow through the vent valve means when the pump is circulating the coolant and the main valve member of the thermostat is in a closed condition against the main valve seat.

For example, see the following three United States patents:

(1) U.S. Pat. No. 2,829,835—Branson
(2) U.S. Pat. No. 3,973,729—Sliger
(3) U.S. Pat. No. 4,091,991—Sliger It appears that the valve seat structure of the thermostat of the engine coolant system of Item (1) above has a vent opening passing therethrough and in which is disposed a "jiggle" pin which permits air to be vented through the opening during a coolant filling operation but which will close the vent opening when a coolant pressure is being created by the coolant pump circulating the coolant at the same time that the thermostat is in its closed condition.

It appears that the movable valve member of the thermostat of the engine coolant system of Item (2) above carries a one-piece valve seat member that confines a movable ball valve member therein which normally maintains the valve seat in an open condition to permit air to vent through the open valve seat from the outlet of the engine to the inlet of the radiator during a coolant filling operation and thereafter moving to a closed position against the valve seat by a coolant pressure when the pump is circulating the coolant through the engine and the thermostat is in a closed condition thereof.

It appears that the vent valve means of the engine coolant system of Item (3) above comprises a small notch disposed in the thermostat which provides a leakage path from the engine side of the thermostat to the radiator so that if the engine cooling system is being filled with coolant through the radiator fill neck, the coolant will pass through the radiator, coolant pump, and the engine coolant passage means. As the coolant fills these passages, the air which the coolant displaces can readily pass through the leak notch of the closed thermostat and then finally through the radiator fill neck to the atmosphere. However, this leak notch in the thermostat does not close and provides a leakage path for the coolant to pass through the leak notch to the radiator during engine operation before the thermostat has opened.

SUMMARY OF THE INVENTION

It is one feature of this invention to provide an improved internal combustion engine coolant system with an improved thermostat vent valve means for venting air from the outlet of the engine to an inlet of the radiator when the thermostat is in a closed condition and the system is being filled with coolant that is introduced into the radiator and for preventing coolant flow through the vent valve means during operation of the coolant pump when the thermostat is in a closed condition.

In particular, it was found according to the teachings of this invention that the prior known thermostat vent valve means were expensive to manufacture not only because of the number of parts thereof, but also because of the assembly costs thereof.

However, it was also found according to the teachings of this invention that the thermostat vent valve means can be made inexpensively when the vent valve member is made to be flexible so as to provide its valving function through a flexing thereof as hereinafter set forth.

For example, one embodiment of this invention provides an internal combustion engine coolant system having a radiator for receiving coolant into an inlet thereof from an outlet of the engine through a thermostat disposed intermediate the outlet of the engine and the inlet of the radiator and having a coolant pump for circulating the coolant through the engine from an inlet of the engine to the outlet thereof, the pump having a first inlet interconnected to the outlet of the engine upstream of the thermostat and a second inlet interconnected to the outlet of the radiator while having its outlet interconnected to the inlet of the engine. The thermostat has a vent valve means carried by the main valve member thereof for venting air from the outlet of the engine to the inlet of the radiator when the main valve member of the thermostat is in a closed condition against the main valve seat thereof and the system is being filled with coolant that is being introduced into the radiator and for preventing coolant flow through the vent means when the pump is circulating the coolant and the main valve member of the thermostat is in a closed condition against the main valve seat. The vent valve means comprises a vent opening through the main valve member of the thermostat and a flexible vent valve member for opening and closing the vent opening. The flexible vent valve member is normally held in spaced relation from the vent opening and is adapted to be flexed against the vent opening to close the vent opening by the coolant being circulated by the pump.

Accordingly, it is an object of this invention to provide an improved internal combustion engine coolant system having one or more of the novel features of this invention as set forth above or hereinafter shown or described.

Another object of this invention is to provide a method of making such an internal combustion engine coolant system, the method of this invention having one or more of the novel features of this invention as set forth above or hereinafter shown or described.

Another object of this invention is to provide an improved thermostat for an internal combustion engine coolant system, the thermostat of this invention having one or more of the novel features of this invention as set forth above or hereinafter shown or described.

Another object of this invention is to provide a method of making such a thermostat, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
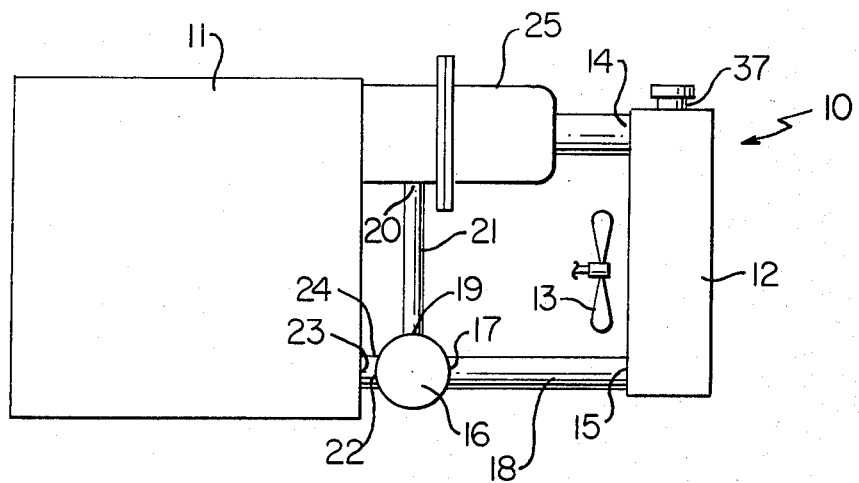
FIG. 1 is a schematic view illustrating the internal combustion engine coolant system of this invention.

While the various features of this invention are hereinafter described and illustrated as being particularly adapted to provide a coolant system for an internal combustion engine, it is to be understood that the various features of this invention can be utilized singly or in any combination thereof to provide a coolant system for other devices as desired.

Therefore, this invention is not to be limited to only the embodiments illustrated in the drawings, because the drawings are merely utilized to illustrate one of the wide variety of uses of this invention.

Referring now to FIG. 1, the improved internal combustion engine coolant system of this invention is generally indicated by the reference numeral 10 and comprises a conventional internal combustion engine 11 having a conventional radiator 12 adapted to have air drawn across the same by an engine driven fan 13 so as to cool the coolant that is circulating from an inlet 14 of the radiator 12 to an outlet 15 thereof by a coolant circulating pump 16 that has one inlet 17 interconnected to the outlet 15 of the radiator 12 by a conduit means 18 while another inlet 19 of the pump 16 is interconnected to an outlet 20 of the coolant passage means (not shown) of the internal combustion engine 11 by a consuit means 21, the outlet 22 of the pump 16 being interconnected to the coolant inlet 23 of the coolant passage means of the engine 11 by the conduit means 24.

Figure 2:
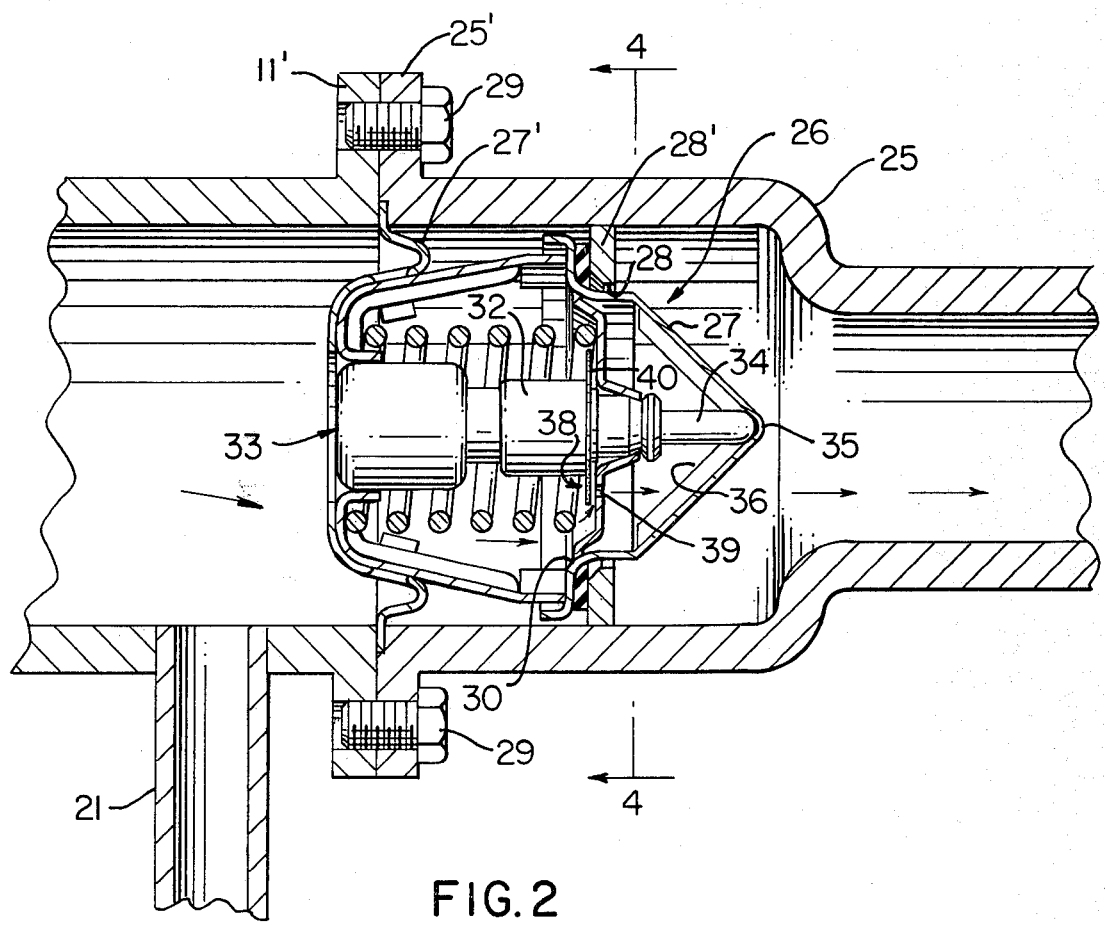
FIG. 2 is an enlarged fragmentary cross-sectional view of the engine cooling system of FIG. 1. and is taken substantially on line 2—2 of FIG. 1.

The outlet 20 of the coolant passage means of the engine 11 is interconnected to the inlet 14 of the radiator 12 by a thermostat outlet housing 25 that carries a self-contained thermostat 26 of this invention therein as illustrated in FIG. 2, the thermostat 26 having a shaped flange means 27 that spans and is sealed outboard an opening 28 passing through an internal abutment means 28' of the outlet housing 25 and being held in such position by a strap 27' of the thermostat 26 being trapped between the outlet housing 25 and the engine 11 as illustrated in FIG. 2 when a securing flange 25' of the outlet housing 25 is secured to a securing flange 11' of the engine 11 by suitable fastening members 29 as illustrated and as conventional in the art.

The thermostat 26 is of the type fully disclosed and claimed in the copending patent application of Boyd P. Sliger, Ser. No. 024,575, filed Mar. 28, 1979 and such disclosure is being incorporated into this disclosure by reference thereto. However, it is to be understood that the vent valve means of this invention is not limited to being utilized with such thermostat 26, because the vent valve means of this invention can be utilized with other types of thermostats as desired.

The flange means 27 of the thermostat 26 has a valve seat portion 30 adapted to be opened and closed by a valve member 31 carried on a cylinder 32 of a piston and cylinder type thermally responsive device 33 that has its piston 34 bearing against an apex portion 35 of the flange means 27, the apex portion 35 of the flange means 27 having opening means 36 provided therethrough downstream from the valve seat portion 30 so that when the valve member 31 is in an open condition relative to the valve seat portion 30, coolant from the engine outlet 20 can pass through the opened valve seat 30 of the thermostat construction 26 and opening 28 of the thermostat outlet housing 25 and, thus, to the inlet 14 of the radiator 12 to be cooled thereto before being returned to by the pump 16 to cool the engine 11. However, when the valve member 31 is disposed in a closed condition illustrated in FIG. 2 against the valve seat portion 30 of the thermostat construction 26, coolant at the outlet 20 of the engine 11 is prevented from flowing through the outlet housing 25 to the inlet 14 of the radiator 12 so that if the pump 16 is operated at the time the valve seat 30 of the thermostat 26 is closed, such as when a cold engine 11 is initially started, the pump 16 draws the coolant from the outlet 20 of the engine 11 through the conduit means 21 into the inlet 19 of the pump 16 and back into the inlet 23 of the engine 11 so that the engine 11 can warm up without having the coolant cooled by the radiator 12 at this engine warm-up time.

When the thermostat 26 is in the open condition by having been heated to the predetermined opening temperature of the device 33 by a now warmed-up engine 11, and the pump 16 is operating, the pump 16 causes the coolant to flow from the outlet 20 of the engine 11 and through the open thermostat 26 to the inlet 14 of the radiator 12 as the inlet 17 of the operating pump 16 is drawing the coolant from the outlet 15 of the radiator 12 and directing the same back into inlet 23 of the engine 11 whereby the coolant being circulated will be cooled in the radiator 12 as the same has become over heated in the engine 11. In this manner the coolant maintains the engine at the proper operating temperature as is conventional in the art.

As set forth in the three aforementioned U.S. Patents, which are being incorporated into this disclosure by reference thereto, one of the problems with an internal combustion coolant system similar to the system 10 of this invention is that when coolant is being added to the radiator 12 through a conventional fill neck 37 thereof, the introduced coolant flows down the radiator 12, out the radiator outlet 15, through the pump 16 and into the inlet 23 of the coolant passage means of the engine 11 and since the thermostat 26 is normally closed under such cool condition of the engine 11, air becomes trapped by the rising head of coolant in the outlet 20 of the coolant passage means of the engine 11 to the point where a sufficient back pressure is developed by the trapped air in the engine 11 to prevent further filling of the system with coolant. However, the volume of trapped air is so large that the total amount of coolant that can be added to the system 10 is insufficient to provide for a proper amount of coolant to permit the engine 11 to subsequently run at a safe temperature thereof. Therefore, as set forth in the aforementioned three U.S. Patents, vent means have been provided in the thermostat itself to vent the trapped air through the closed thermostat 26 during the coolant filling operation and thereby permit the trapped air in the engine 11 to flow to the inlet 14 of the radiator 12 through the vent opening of the thermostat. However, when the system 10 is subsequently operating by having the pump 16 circulate coolant through the engine 11 and the engine 11 is at a cold condition thereof, the thermostat 26 will be in a closed condition and the coolant will pass from the outlet 20 of the engine 11 to the inlet 19 of the pump 16 and back to the inlet 23 of the engine 11 so that the coolant can heat sufficiently to permit the engine 11 to reach the required operating temperature thereof. As previously stated, the vent means of the first two aforementioned U.S. Patents each has a movable valve member that closes the vent opening during such circulating operation of the coolant by the pump when the thermostat is closed so as to prevent the coolant from being bypassed through the vent means to the inlet of the radiator and preventing the coolant from being heated sufficiently during engine warm-up as the radiator will cool the vented coolant.

However, as previously stated, it has been found according to the teachings of this invention that the prior known vent valve means are relatively expensive not only because of the number of parts required therefor, but also because of the cost of assembly thereof.

Accordingly, it has been found according to the teachings of this invention that improved vent valve means can be provided for the thermostat 26 and the same is generally indicated by the reference numeral 38 in the drawings and will now be described.

The vent valve means 38 of this invention comprises a small vent opening 39 formed through the body of the valve member 31 of the thermostat 26 and a washer-like flexible valve member 40 carried by the cylinder 32 of the temperature responsive device 33 adjacent the valve member 31 to open and close the vent opening 38 through flexed conditions of the flexible valve member 40 in a manner hereinafter set forth.

The valve member 31 has a centrally disposed tubular portion 41 which subsequently receives a reduced part 42 of the cylinder 32 of the device 33 therein so that the outer peripheral portion 43 of the tubular part 41 of the valve member 31 can be turned into an annular groove 44 formed in the part 42 of the cylinder 32 of the device 33 to secure the valve member 31 thereto as well as to seal the valve member 31 to the cylinder 32 in a manner well known in the art.

However, before the valve member 31 is so secured to the cylinder 32 of the device 33, the valve member 31 is provided with a pair of dimples 45 formed into an annular flat surface 46 thereof that surrounds the tubular portion 41 so as to form a pair of abutment means 47 that extend outwardly from the opposed annular flat surface 48 of the valve member 31, the abutments 47 being disposed in spaced relation and on opposite sides of the vent opening 39 for a purpose hereinafter described.

Figure 5:
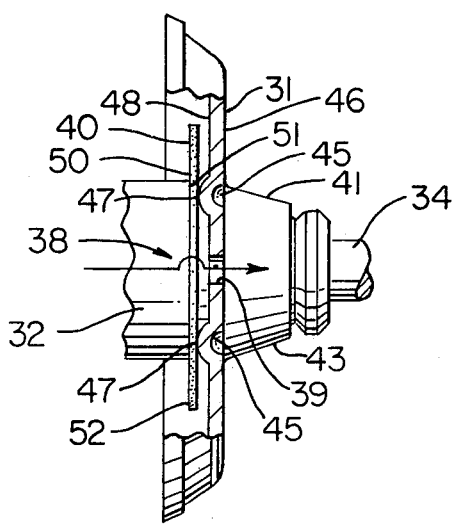
FIG. 5 is an enlarged fragmentary cross-sectional view of the vent valve means of the thermostat of this invention and illustrates the vent valve means in the open condition thereof.

Also, before the valve member 31 is fastened to the part 42 of the cylinder 32 of the device 33 in the manner previously described, the washer-like flexible valve member 40 is telescoped onto the part 42 of the cylinder 32 of the device 33 by receiving the same through an opening 49 centrally formed therethrough so that the resulting inner peripheral portion 50 of the flexible valve member 40 will rest against an annular shoulder 51 formed on the cylinder 32 in a manner that will subsequently face the valve member 31 as illustrated in FIG. 5 whereby the outer peripheral portion 52 of the flexible valve member 40 will normally engage against the abutments 47 of the valve member 31 in unrestrained relation when the valve member 31 is subsequently fastened to the part 42 of the cylinder 32 as illustrated in FIG. 5.

In this manner, it has been found that when the flexible valve member 40 is disposed in the unflexed condition illustrated in FIG. 5 and a normal flow of air is being vented from the left side thereof to the right side thereof through the vent opening 39, the abutments 47 sufficiently hold the outer peripheral portion 52 of the flexible valve member 40 spaced from the substantially flat surface 48 adjacent the vent opening 39 in the manner illustrated in FIG. 5 so that air can vent around the peripheral portion 52 of the valve member 40 and between the valve member 40 and the surface 48 intermediate the abutments 47 to the opening 39 and through the same. However, as the back pressure or pressure differential across the valve member 40 increases to a certain amount, the pressure differential acting across the flexible valve member 40 causes the same to flex sufficiently so that the valve member 40 will seal against the surface 48 completely around the vent opening 39 in the manner illustrated in FIG. 6 to close the vent opening 39 and maintain the same in a closed condition as long as a sufficient pressure differential axists across the valve member 40, such as when the coolant pump 16 is circulating the coolant through the coolant passage means of the engine 11 and the thermostat 26 is in a closed condition thereof.

While the flexible valve member 40 can be assembled to the cylinder 32 of the device 33 in any suitable manner, it is presently contemplated that the flexible washer-like member 40 will be stamped from a roll of rubber tape on the conventional assembly machine that fastens the valve member 31 to the cylinder 32 of the device 33 so that the flexible valve member 40 will be formed and immediately dropped onto the shoulder 51 of the cylinder 32 before the valve member 31 is assembled thereto by the assembly machinery that already is utilized to fasten the valve members 31 to the cylinders 32 of the devices 33.

Therefore, it can be seen that it is a relatively simple method of this invention to form the improved thermostat 26 of this invention to cause the same to operate in the system 10 in a manner now to be described.

When it is desired to add coolant into the system 10 by pouring the same through the filler neck 37 of the radiator 12 in a manner conventional in the art, the thermostat 26 is normally in its closed condition as illustrated in FIG. 2 because the engine 11 is not running at this time and its temperature responsive device 33 is not sensing a temperature that requires the valve member 31 of the thermostat 26 to be in an open condition.

As the coolant is being introduced through the filler neck 37 into the radiator 12, the coolant flows through the outlet 15 of the radiator 12, through the not operating pump 16 into the inlet 23 for the coolant passage means of the engine 11 and begins to rise in the coolant passage means of the engine 11. The rising head of coolant in the coolant passage means of the engine 11 would tend to trap air in the outlet 20 of the engine 11 if it were not for the fact that vent valve means 38 of this invention is in the open condition illustrated in FIGS. 2 and 5 wherein the flexible valve member 40 has its outer peripheral portion 52 held away from the vent opening 39 by the abutments 47 of the valve member 31 because there is not a sufficient flow of air through the vent valve means 38 to cause the flexible valve member 40 to flex against the surface 48 of the valve member 31 around the opening 39 during the normal coolant filling operation.

Thus, the air in advance of the rising head of coolant is continuously being vented in the direction indicated by the arrows in FIG. 2 during the coolant filling operation so that a complete supply of coolant can be introduced into the system 10 to cause the coolant system 10 to operate efficiently.

Figure 3:
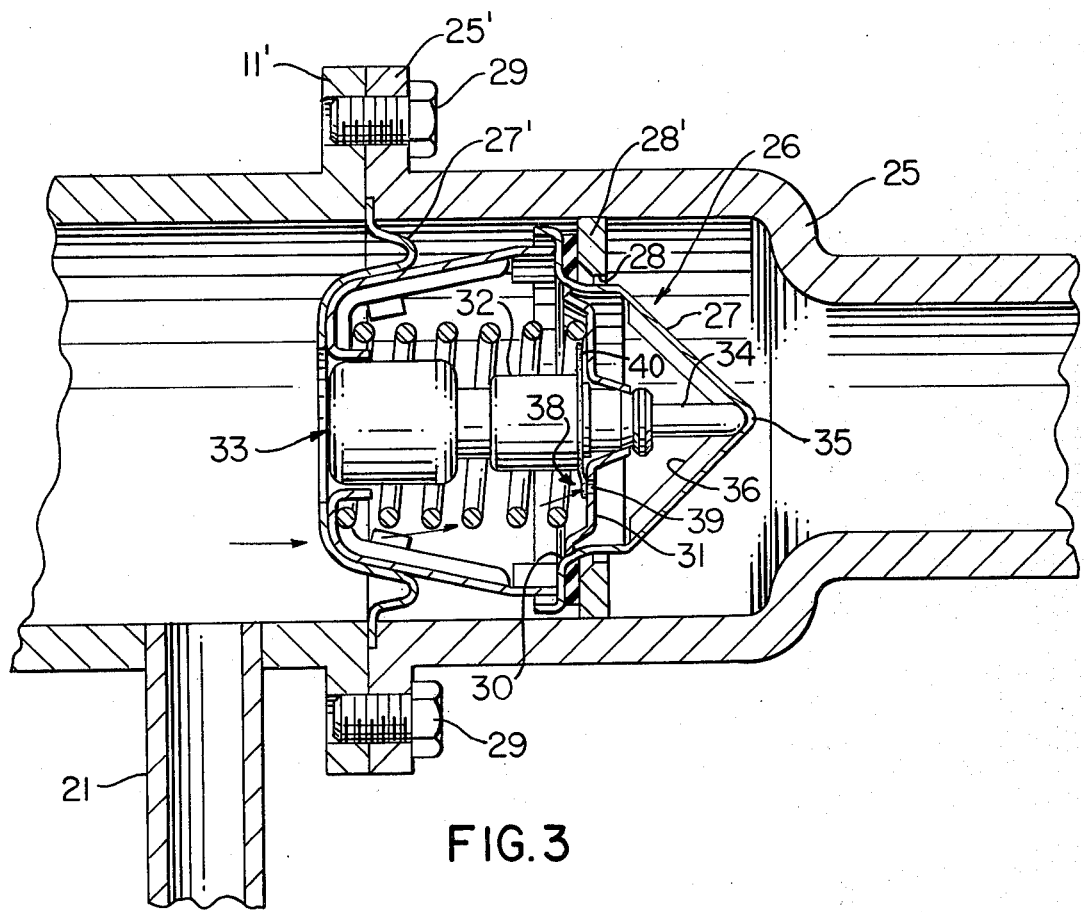
FIG. 3 is a view similar to FIG. 2 and illustrates the vent valve means in its closed condition.
Figure 4:
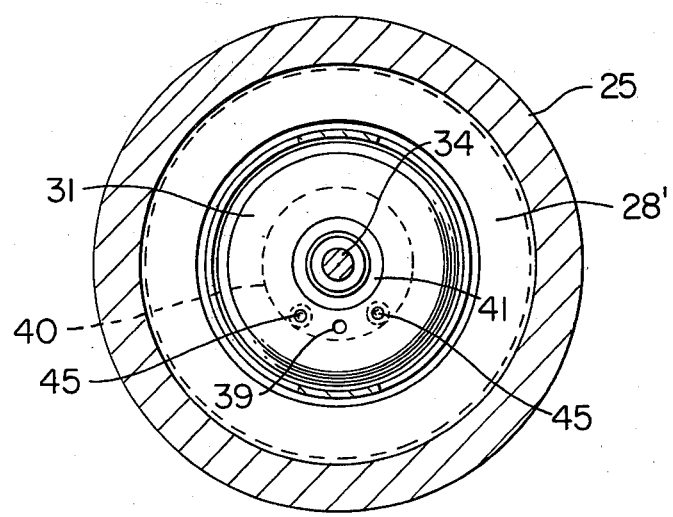
FIG. 4 is a fragmentary cross-sectional view taken on line 4—4 of FIG. 2.
Figure 7:
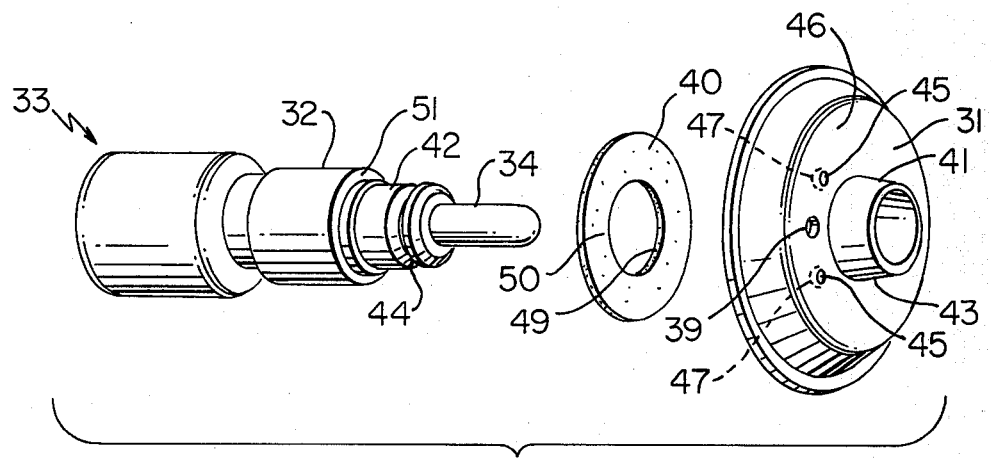
FIG. 7 is an enlarged exploded perspective view illustrating the vent valve means of this invention before the same has been assembled.
Figure 6:
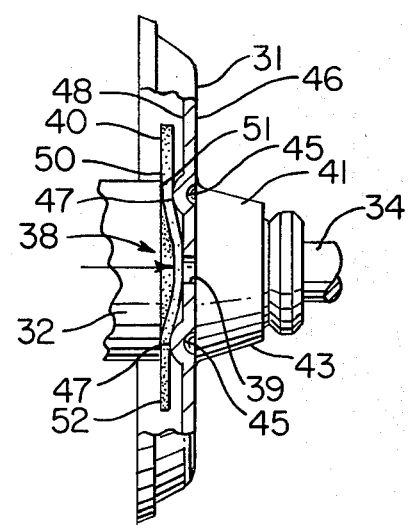
FIG. 6 is a view similar to FIG. 5 and illustrates the vent valve means in the closed condition thereof.

During the operation of the internal combustion engine coolant system 10, when the engine 11 is initially running in a cold condition thereof and driving the pump 16 to circulate the coolant throughout the coolant passage means of the engine 11, the temperature of the coolant is such that the same is below the temperature for the device 33 to open the valve member 31 of the thermostat 26 so that the coolant now begins to build up pressure in the outlet 20 of the engine 11 and would tend to pass through the vent valve means 38 except that the flow of coolant is now at such rate and pressure that the coolant flowing across the flexible valve member 40 causes the same to flex in between the abutments 47 and seal against the surface 48 around the vent opening 39 to completely close the vent opening means 39 in the manner illustrated in FIGS. 3 and 6 so that the coolant will be bypassed from the outlet 20 down through the conduit means 21 to the inlet 19 of the pump 16 to be continuously circulating through the engine 11. In this manner, that portion of the coolant being circulated through the coolant passage means of the engine 11 can warm up and thereby permit the engine 11 to warm up to its optimum operating temperature.

Thereafter, when the temperature of the coolant being circulated through the coolant passage means of the engine 11 by the pump 16 during the operation of the engine 11 reaches a temperature that causes the device 33 to move the valve member away from the valve seat portion of the thermostat 26, the coolant that is now circulating through the radiator 12 by the open thermostat 26 will be cooled in the radiator 12 and thereby maintain the proper operating temperature for the continuously running engine 11 in a manner well known in the art.

The desired amount of air flow or fluid flow through the vent opening 39 of the vent valve means 38 of this invention before the flexible valve member 40 will be flexed into closing the vent opening 39 in the manner previously described can be obtained in several ways. For example, to increase the maximum air flow before closure (to increase the rate at which coolant can be added without closure) the hole size of the vent opening 39 can be varied and/or the two abutments 47 can be moved closer to the vent opening 39. However, if this is not desired, the height of the abutments 47 from the surface 48 can be increased. Another alternative would be to increase the durometer rating and/or the thickness of the elastomer washer-like member 49.

Further, while only one vent opening 39 and only two abutments 47 are illustrated and described in combination therewith, it is to be understood that a plurality of abutments 47 can be utilized in any suitable arrangement relative to the vent opening 39 and it may be found that only one abutment 47 is required. Also, more than one vent opening 39 and various combinations of abutments can be provided therefor for each valve member 31 as desired.

Therefore, it can be seen that this invention not only provides an improved internal combustion engine coolant system and an improved thermostat therefor, but also this invention provides improved methods of making such an internal combustion engine coolant system and thermostat therefor.

While the forms and methods of this invention now preferred have been illustrated and described as required by the Patent Statute, it is to be understood that other forms and method steps can be utilized and still fall within the scope of the appended claims.

What is claimed is:

1. In an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said flexible vent valve member normally being held in spaced relation from said vent opening and being adapted to be flexed against said vent opening to close said vent opening by said coolant being circulated by said pump.

2. A system as set forth in claim 1 wherein said thermostat has a piston and cylinder type temperature responsive device operatively associated with said main valve member for moving said main valve member relative to said main valve seat.

3. A system as set forth in claim 2 wherein said device has a cylinder member, said main valve member being secured to cylinder member to said move in unison therewith, said flexible vent valve member being carried by said cylinder member adjacent said valve member.

4. In an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seal thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said main valve member having a substantially flat surface surrounding said vent opening, said flat surface having abutment means extending outwardly from said flat surface adjacent said vent opening, said flexible vent valve member being adapted to engage said abutment means in one flexed condition thereof to seal around said vent opening at said surface to close said vent opening and to engage said abutment means in another flexed condition thereof that will not seal around said vent opening at said surface so that said vent opening is open.

5. A system as set forth in claim 4 wherein said abutment means comprise a plurality of abutments.

6. A system as set forth in claim 5 wherein said plurality of abutments comprises two abutments disposed on opposite sides of said vent opening.

7. A system as set forth in claim 6 wherein said flexible valve member spans said abutments.

8. In an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said thermostat having a piston and cylinder type temperature responsive device operatively associated with said main valve member for moving said main valve member relative to said main valve seat, said device having a cylinder member, said main valve member being secured to said cylinder member to move in unison therewith, said flexible vent valve member being carried by said cylinder member adjacent said valve member, said cylinder member having an annular shoulder spaced from said main valve member, said flexible vent valve member comprising a washer like member having an inner peripheral portion disposed against said shoulder and an outer peripheral portion extending outboard of said vent opening.

9. A system as set forth in claim 8 wherein said main valve member has a substantially flat surface surrounding said vent opening, said flat surface having two abutment means extending outwardly from said flat surface adjacent said vent opening and on opposite sides thereof, said flexible vent valve member being adapted to engage said abutment means in one flexed condition thereof to seal around said vent opening at said surface and intermediate said inner and outer peripheral portions thereof to close said vent opening and to engage said abutment means in another flexed condition thereof that will not seal around said vent opening at said surface so that said vent opening is open to beyond said outer peripheral portion of said flexible vent valve member intermediate said surface and said flexible vent valve member and intermediate said abutment means.

10. A system as set forth in claim 9 wherein said thermostat has a coiled compression spring provided with one end bearing against said main valve member to tend to move said main valve member toward said main valve seat, said outer peripheral portion of said flexible vent valve member being disposed concentrically within said one end of said coiled compression spring and inboard thereof.

11. In a method of making an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, and forming said flexible vent valve member to be normally held in spaced relation from said vent opening and to be adapted to be flexed against said vent opening to close said vent opening by said coolant being circulated by said pump.

12. A method of making a system as set forth in claim 11 and including the steps of forming said thermostat with a piston and cylinder type temperature responsive device, and operatively associating said device with said main valve member for moving said main valve member relative to said main valve seat.

13. A method of making a system as set forth in claim 12 and including the steps of forming said device to have a cylinder member, securing said main valve member to said cylinder member to move in unison therewith, and disposing said flexible vent valve member to be carried by said cylinder member adjacent said valve member.

14. In a method of making an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, forming said main valve member to have a substantially flat surface surrounding said vent opening, forming said flat surface to have abutment means extending outwardly from said flat surface adjacent said vent opening, and disposing said flexible vent valve member to be adapted to engage said abutment means in one flexed condition thereof to seal around said vent opening at said surface to close said vent opening and to engage said abutment means in another flexed condition thereof that will not seal around said vent opening at said surface so that said vent opening is open.

15. A method of making a system as set forth in claim 14 and including the step of forming said abutment means to comprise a plurality of abutments.

16. A method of making a system as set forth in claim 15 and including the step of forming said plurality of abutments to comprise two abutments disposed on opposite sides of said vent opening.

17. A method of making a system as set forth in claim 16 and including the step of disposing said flexible valve member to span said two abutments.

18. In a method of making an internal combustion engine coolant system having a radiator for receiving coolant into an inlet thereof from an outlet of said engine through a thermostat disposed intermediate said outlet of said engine and said inlet of said radiator and having a coolant pump for circulating said coolant through said engine from an inlet of said engine to said outlet thereof, said pump having a first inlet interconnected to said outlet of said engine upstream of said thermostat and a second inlet interconnected to the outlet of said radiator while having its outlet interconnected to said inlet of said engine, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, forming said thermostat with a piston and cylinder type temperature responsive device, operatively associating said device with said main valve member for moving said main valve member relative to said main valve seat, forming said device to have a cylinder member, securing said main valve member to said cylinder member to move in unison therewith, disposing said flexible vent valve member to be carried by said cylinder member adjacent said valve member, forming said cylinder member to have an annular shoulder spaced from said main valve member, forming said flexible vent valve member to comprise a washer like member, and disposing an inner peripheral portion of said washer like member against said shoulder with an outer peripheral portion thereof extending outboard of said vent opening.

19. A method of making a system as set forth in claim 18 and including the steps of forming said main valve member to have a substantially flat surface surrounding said vent opening, forming said flat surface to have two abutment means extending outwardly from said flat surface adjacent said vent opening and on opposite sides thereof, and disposing said flexible vent valve member to be adapted to engage said abutment means in one flexed condition thereof to seal around said vent opening at said surface and intermediate said inner and outer peripheral portions thereof to close said vent opening and to engage said abutment means in another flexed condition thereof that will not seal around said vent opening at said surface so that said vent opening is open to beyond said outer peripheral portion of said flexible vent valve member intermediate said surface and said flexible vent valve member and intermediate said abutment means.

20. A method of making a system as set forth in claim 19 and including the steps of forming said thermostat with a coiled compression spring, bearing one end of said spring against said main valve member to tend to move said main valve member toward said main valve seat, and disposing said outer peripheral portion of said flexible vent valve member concentrically within said one end of said coiled compression spring and inboard thereof.

21. In a thermostat for an internal com-engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said flexible vent valve member normally being held in spaced relation from said vent opening and being adapted to be flexed against said vent opening to close said vent opening by said coolant being circulated by said pump.

22. A thermostat as set forth in claim 21 wherein said thermostat has a piston and cylinder type temperature responsive device operatively associated with said main valve member for moving said main valve member relative to said main valve seat.

23. A thermostat as set forth in claim 22 wherein said device has a cylinder member, said main valve member being secured to said cylinder member to move in unison therewith, said flexible vent valve member being carried by said cylinder member adjacent said valve member.

24. In a thermostat for an internal combustion engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venging air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said main valve member having a substantially flat surface surrounding said vent opening, said flat surface having abutment means extending outwardly from said flat surface adjacent said vent opening, said flexible vent valve member being adapted to engage said abutment means in one flexed condition thereof to seal around said vent opening at said surface to close said vent opening and to engage said abutment means in another flexed condition thereof that will not seal around said vent opening at said surface so that said vent opening is open.

25. A thermostat as set forth in claim 24 wherein said abutment means comprise a plurality of abutments.

26. A thermostat as set forth in claim 25 wherein said plurality of abutments comprises two abutments disposed on opposite sides of said vent opening.

27. A thermostat as set forth in claim 26 wherein said flexible valve member spans said two abutments.

28. In a thermostat for an internal combustion engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement wherein said vent valve means comprises a vent opening through said main valve member and a flexible vent valve member for opening and closing said vent opening, said thermostat having a piston and cylinder type temperature responsive device operatively associated with said main valve member for moving said main valve member relative to said main valve seat, said device having a cylinder member, said main valve member being secured to said cylinder member to move in unison therewith, said flexible vent valve member being carried by said cylinder member adjacent said valve member, said cylinder member having an annular shoulder spaced from said main valve member, said flexible vent valve member comprising a washer like member having an inner peripheral portion disposed against said shoulder and an outer peripheral portion extending outboard of said vent opening.

29. A thermostat as set forth in claim 28 wherein said main valve member has a substantially flat surface surrounding said vent opening, said flat surface having two abutment means extending outwardly from said flat surface adjacent said vent opening and an opposite sides thereof, said flexible vent valve member being adapted to engage said abutment means in one flexed condition thereof to seal around said vent opening at said surface and intermediate said inner and outer peripheral portions thereof to close said vent opening and to engage said abutment means in another flexed condition thereof that will not seal around said vent opening at said surface so that said vent opening is open to beyond said outer peripheral portion of said flexible vent valve member intermediate said surface and said flexible vent valve member and intermediate said abutment means.

30. A thermostat as set forth in claim 29 wherein said thermostat has a coiled compression spring provided with one end bearing against said main valve member to tend to move said main valve member toward said main valve seat, said outer peripheral portion of said flexible vent valve member being disposed concentrically within said one end of said coiled compression spring and inboard thereof.

31. In a method of making a thermostat for an internal combustion engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, and forming said flexible vent valve member to be normally held in spaced relation from said vent opening and to be adapted to be flexed against said vent opening to close said vent opening by said coolant being circulated by said pump.

32. A method of making a thermostat as set forth in claim 31 and including the steps of forming said thermostat with a piston and cylinder type temperature responsive device, and operatively associating said device with said main valve member for moving said main valve member relative to said main valve seat.

33. A method of making a thermostat as set forth in claim 32 and including the steps of forming said device to have a cylinder member, securing said main valve member to said cylinder member to move in unison therewith, and disposing said flexible vent valve member to be carried by said cylinder member adjacent said valve member.

34. In a method of making a thermostat for an internal combustion engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, forming said main valve member to have a substantially flat surface surrounding said vent opening, forming said flat surface to have abutment means extending outwardly from said flat surface adjacent said vent opening, and disposing said flexible vent valve member to be adapted to engage said abutment means in one flexed condition thereof to seal around said vent opening at said surface to close said vent opening and to engage said abutment means in another flexed condition thereof that will not seal around said vent opening at said surface so that said vent opening is open.

35. A method of making a thermostat as set forth in claim 34 and including the step of forming said abutment means to comprise a plurality of abutments.

36. A method of making a thermostat as set forth in claim 35 and including the step of forming said plurality of abutments to comprise two abutments disposed on opposite sides of said vent opening.

37. A method of making a thermostat as set forth in claim 36 and including the step of disposing said flexible valve member to span said two abutments.

38. In a method of making a thermostat for an internal combustion engine coolant system having a radiator for receiving coolant into an inlet thereof from an outlet of said engine through said thermostat when disposed intermediate said outlet of said engine and said inlet of said radiator and having a coolant pump for circulating said coolant through said engine from an inlet of said engine to said outlet thereof, said thermostat having a vent valve means carried by the main valve member thereof for venting air from said outlet of said engine to said inlet of said radiator when said main valve member of said thermostat is in a closed condition against the main valve seat thereof and said system is being filled with coolant that is being introduced into said radiator and for preventing coolant flow through said vent valve means when said pump is circulating said coolant and said main valve member of said thermostat is in a closed condition against said main valve seat, the improvement comprising the steps of forming said vent valve means to comprise a vent opening through said main valve member and a flexible vent valve member for opening and closing said vent opening, forming said thermostat with a piston and cylinder type temperature responsive device, operatively associating said device with said main valve member for moving said main valve member relative to said main valve seat, forming said device to have a cylinder member, securing said main valve member to said cylinder member to move in unison therewith, disposing said flexible vent valve member to be carried by said cylinder member adjacent said valve member, forming said cylinder member to have an annular shoulder spaced from said main valve member, forming said flexible vent valve member to comprise a washer like member, and disposing an inner peripheral portion of said washer like member against said shoulder with an outer peripheral portion thereof extending outboard of said vent opening.

39. A method of making a thermostat as set forth in claim 38 and including the steps of forming said main valve member to have a substantially flat surface surrounding said vent opening, forming said flat surface to have two abutment means extending outwardly from said flat surface adjacent said vent opening and on opposite sides thereof, and disposing said flexible vent valve member to be adapted to engage said abutment means in one flexed condition thereof to seal around said vent opening at said surface and intermediate said inner and outer peripheral portions thereof to close said vent opening and to engage said abutment means in another flexed condition thereof that will not seal around said vent opening at said surface so that said vent opening is open to beyond said outer peripheral portion of said flexible vent valve member intermediate said surface and said flexible vent valve member and intermediate said abutment means.

40. A method of making a thermostat as set forth in claim 39 and including the steps of forming said thermostat with a coiled compression spring, bearing one end of said spring against said main valve member to tend to move said main valve member toward said main valve seat, and disposing said outer peripheral portion of said flexible vent valve member concentrically within said one end of said coiled compression spring and inboard thereof.

* * * * *